July 19, 1955
O. H. SCHMITT
2,713,661
PHASE-SHIFT MAGNETOMETER
Filed Aug. 7, 1944
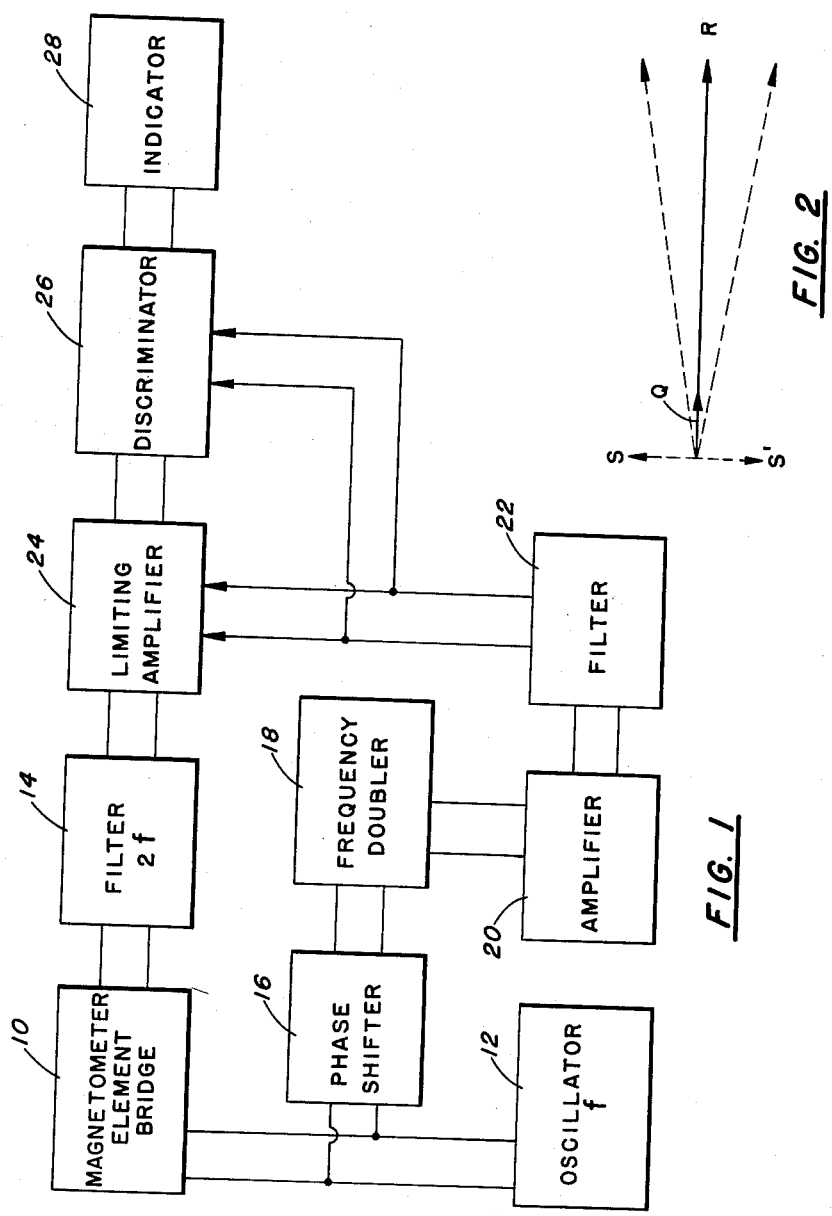
INVENTOR
OTTO H. SCHMITT
BY
ATTORNEYS United States Patent Office 2,713,661
Patented July 19, 1955

2,713,661

PHASE-SHIFT MAGNETOMETER

Otto H. Schmitt, Port Washington, N. Y., assignor to the United States of America as represented by the Secretary of the Navy Application August 7, 1944, Serial No. 548,488

6 Claims. (Cl. 324—43)

This invention relates to magnetometers, and more particularly to magnetometers utilizing saturated-core magnetometer elements connected in a bridge circuit and operated as a balanced magnetometer. Such arrangements of magnetometer elements, in conjunction with suitable auxiliary circuits, are used for measuring the intensities of magnetic fields, and are particularly useful for measuring small changes or anomalies in magnetic fields.

When a pair of saturated-core magnetometer elements are operated as a balanced magnetometer and driven cyclically into and out of saturation by means of a suitable source of excitation, their output with applied magnetic field is a series of unipolar sensitive pulses having a pulse frequency of twice the drive frequency, the magnitude and polarity of the pulses varying with like changes in applied magnetic field.

Various magnetometer systems have been devised utilizing the balanced bridge elements referred to above, in accordance with which the output of the elements is applied to suitable detecting and amplifying circuits arranged to measure the pulse height directly. Ideally these systems have zero output when there is no applied field, and have an output varying with applied field under all other conditions. It is found, however, that unless extreme care is used to insure accurate balance of the saturated-core elements and other portions of the magnetometer bridge circuit, the magnetometer system is insensitive for relatively small applied fields, this being due to the fact that "hash" components of random phase and independent of applied field in the output of the bridge effectively obscure the sensitive pulses. Furthermore, changes in amplification in succeeding circuits due to variations in power supply and other unbalances in general cause spurious output signals of the same order of magnitude as those produced by applied magnetic fields.

It is an object of the present invention, therefore, to provide a magnetometer system in which the disadvantageous effects of random "hash" components in the element output are eliminated without necessitating the use of precisely balanced circuits, and which is relatively insensitive to supply-voltage variations.

It is proposed in accordance with the present invention to provide a magnetometer system utilizing saturated-core magnetometer elements connected in a bridge circuit driven cyclically and operated as a balanced magnetometer, in which the bridge output is passed through a second-harmonic filter and the filter output due to the sensitive output of the bridge is utilized to produce a phase shift in a reference signal of the same frequency and in quadrature with the sensitive filter output, the phase shifted signal then being amplitude limited and the phase shift produced therein measured.

For a better understanding of the invention, reference is made to the accompanying drawing, in which:

Fig. 1 is a block diagram of the improved magnetometer system; and

Fig. 2 is a vector diagram showing the relationship between the sensitive signal and the quadrature reference signal at the input of the limiter.

As shown in Fig. 1, the magnetometer system includes magnetometer-element bridge 10, which comprises a pair of saturated-core magnetometer elements connected in a conventional bridge circuit and arranged to be driven cyclically into and out of saturation by means of oscillator 12. The sensitive output of bridge 10 is a series of unipolar pulses having a pulse frequency equal to twice the drive frequency supplied by oscillator 12 and varying in amplitude and polarity with field acting on the magnetometer elements. Due to the fact that perfect balance of the bridge is not easily obtained with the degree of precision found in instruments of this nature, the output also contains "hash" components of random phase.

The output of bridge 10 is applied to tuned filter 14, which passes only components having a frequency equal to twice the drive frequency. In the absence of applied magnetic field, the second-harmonic output of filter 14 includes components of random phase proportional to the second-harmonic "hash" components found in the output of the magnetometer bridge. Applied magnetic fields cause the addition to the output of a second-harmonic component having an amplitude proportional to the height of the pulses at the output of magnetometer bridge 10. Since the "hash" components are of random phase, some of them are algebraically in phase with the sensitive component while others are in quadrature therewith. The algebraically in-phase "hash" components merely add to the sensitive component, producing an unbalance in the measuring system which may be corrected by simple centering adjustments. The effect of the "hash" components in quadrature with the sensitive component cannot be eliminated in any ordinary amplitude-sensitive measuring system.

The filter output is utilized, therefore, to produce a phase shift in a reference signal of second-harmonic frequency and in quadrature with the sensitive component at the output of the filter. Conveniently the reference signal is obtained from oscillator 12 by means of a circuit including a phase shifter 16, a frequency doubler 18, an amplifier 20, and a second-harmonic filter 22, all of these circuit components being of conventional types. The gain of amplifier 20 is so adjusted that the amplitude of the reference signal is at least three times that of the largest expected component due to applied field in the output of filter 14. The two signals are applied to limiting amplifier 24 in the input circuits of which they are combined vectorially.

Referring to Fig. 2 of the drawing, there is shown a vector diagram indicating the phase relationships between the various components present in the input to amplifier 24. Vector Q represents the quadrature component at the output of filter 14, while vector R in the same direction represents the reference signal. Components due to the sensitive pulses are algebraically in phase and lie along the line SS'. The resultant input to limiting amplifier 24 may then be represented by a vector the phase of which is shifted in respect to the quadrature reference signal by an amount proportional to the applied field, the amplitude of this vector varying also with applied field as indicated in Fig. 2. Amplifier 24 is a conventional limiting amplifier and its only requirements are that its output be substantially constant for all amplitudes of input signal and that the phase shift introduced thereby be substantially constant and independent of supply-voltage variations.

It will be understood then that the output of amplifier 24 is a voltage of constant amplitude but of phase varying in accordance with magnetic field acting at magnetometer elements 10. This signal is fed to a phase discriminator 26 in which it is compared in phase with the quadrature reference signal applied from the output of filter 22, the discriminator being arranged to produce a voltage varying in accordance with the phase angle between the two signals.

The output of discriminator 26 is applied to an indicator 28, which may conveniently be a recording milliammeter whereby visual indications of variations in the applied magnetic field may be obtained.

What is claimed is:

1. A phase-shift magnetometer system comprising a balanced magnetometer; means for driving said magnetometer cyclically; a filter for isolating sensitive components in the output of the magnetometer of twice the drive frequency; means for generating a reference signal of twice the drive frequency and in phase quadrature with the sensitive output of the filter, this signal having an amplitude at least three times that of the signal component at the output of the filter due to applied field; an amplitude-limiting amplifier of constant internal phase shift the output phase of which varies only with the phase of the input thereto, arranged to receive the filter output and to amplify the sum of the reference signal and the output signal of the filter; and means for comparing the phase of the amplifier output with that of the reference signal.

2. In a device as set out in claim 1 where the comparison of the phase results in a voltage proportional thereto, and means for indicating the amplitude of said voltage.

3. For use with a balanced magnetometer including a driving means connected thereto, means for obtaining an output proportional only to changes in an applied magnetic field, comprising a filter tuned to twice the magnetometer driving frequency coupled to the output of the magnetometer and passing a sensitive signal of twice the magnetometer driving frequency; means, including a phase shifter, a frequency doubler, an amplifier and a second-harmonic filter, connected to the driving means providing a reference signal of the same frequency as, in phase quadrature with, and at least three times the amplitude of the sensitive signal; an amplitude-limiting amplifier coupled to the outputs of said tuned filter and said second-harmonic filter for combining the reference signal and the sensitive signal; a phase discriminator coupled to the outputs of said amplitude-limiting amplifier and said second-harmonic filter for comparing the combined signal with the reference signal; and an indicator coupled to said phase discriminator for providing visual indications of variations in the applied magnetic field.

4. A phase-shift magnetometer system comprising a balanced magnetometer; a driving means connected thereto; a filter tuned to twice the magnetometer driving frequency coupled to the output of the magnetometer and passing a sensitive signal of twice the magnetometer driving frequency; means, including a phase shifter, a frequency doubler, an amplifier and a second-harmonic filter, connected to the driving means providing a reference signal of the same frequency as, in phase quadrature with, and at least three times the amplitude of the sensitive signal; an amplitude-limiting amplifier coupled to the outputs of said tuned filter and said second-harmonic filter for combining the reference signal and the sensitive signal; a phase discriminator coupled to the outputs of said amplitude-limiting amplifier and said second-harmonic filter for comparing the combined signal with the reference signal; and an indicator coupled to said phase discriminator for providing visual indications of variations in the applied magnetic field.

5. For use with a balanced magnetometer including a driving means connected thereto, means for obtaining an output proportional only to changes in an applied magnetic field, comprising a filter tuned to twice the magnetometer driving frequency coupled to the magnetometer output and passing a sensitive signal of twice the magnetometer driving frequency; a phase shifter coupled to the driving means; means coupled to the phase shifter providing a reference signal of the same frequency as, in phase quadrature with, and at least three times the amplitude of the sensitive signal; an amplitude-limiting amplifier coupled to the tuned filter output combining the sensitive signal and the reference signal; means coupled to the amplifier comparing the combined signal with the reference signal; and an indicator coupled to said last named means providing a visual indication of variations in the applied magnetic field.

6. A phase-shift magnetometer system comprising a balanced magnetometer; a driving means connected thereto; a filter tuned to twice the magnetometer driving frequency coupled to the output of the magnetometer and passing a sensitive signal of twice the magnetometer driving frequency; a phase shifter coupled to the driving means; means coupled to the phase shifter providing a reference signal of the same frequency as, in phase quadrature with, and at least three times the amplitude of the sensitive signal; an amplitude-limiting amplifier coupled to the tuned filter output combining the sensitive signal and the reference signal; means coupled to the amplifier comparing the combined signal with the reference signal; and an indicator coupled to said last named means providing a visual indication of variations in the applied magnetic field.

References Cited in the file of this patent

UNITED STATES PATENTS

| 2,094,207 | Eaton | Sept. 28, 1937 |
| 2,290,330 | Irwin | July 21, 1942 |
| 2,476,273 | Beach | July 19, 1949 |